A. C. SCHUERMANN.
PIPE CONNECTION.
APPLICATION FILED SEPT. 3, 1908.
934,983.
Patented Sept. 21, 1909.
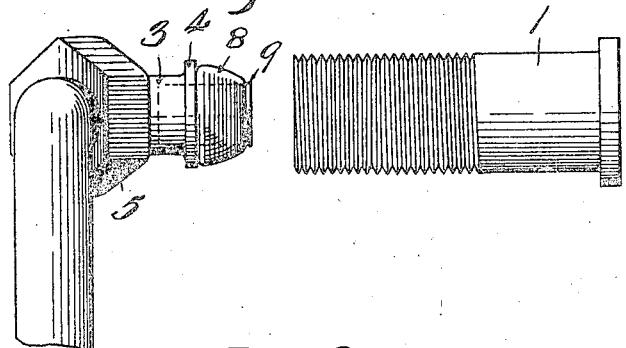
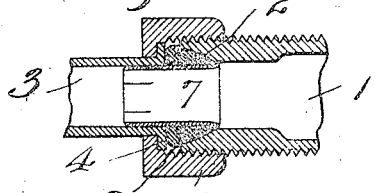
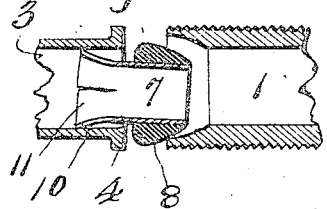
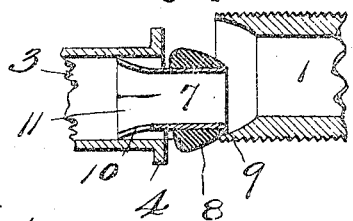
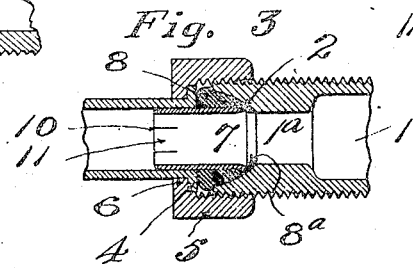
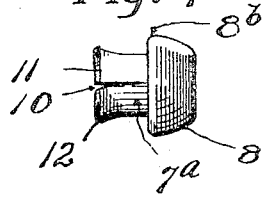
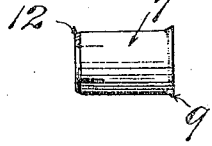
WITNESSES:
Henry D. Plate.
Virginia Hamilton.
INVENTOR
ANTON C. SCHUERMANN.
BY
John L. Waddell
ATTORNEY

UNITED STATES PATENT OFFICE.

ANTON C. SCHUERMANN, OF DECATUR, ILLINOIS, ASSIGNOR TO H. MUELLER MFG. COMPANY, OF DECATUR, ILLINOIS, A CORPORATION OF ILLINOIS.

PIPE CONNECTION.

934,983.   Specification of Letters Patent.   Patented Sept. 21, 1909.

Application filed September 3, 1908. Serial No. 451,621.

*To all whom it may concern:*

Be it known that I, ANTON C. SCHUERMANN, a citizen of the United States, and a resident of Decatur, Macon county, State of Illinois, have invented certain new and useful Improvements in Pipe Connections, and my preferred manner of carrying out the invention is set forth in the following full, clear, and exact description, terminating with claims particularly specifying the novelty.

This invention relates to water distribution, and more especially to pipe couplings, and the object of the same is to produce an improved form of gasket for manual application to the coupling at the time its pipe sections are being connected. In a co-pending application is covered the broad idea of a gasket intended to be inserted by hand and held frictionally in one of such pipe sections so as to leave the hands of the operator free to make the coupling, and the present invention consists in details in the shape of the projecting portion of the gasket whereby its admission into the pipe section is facilitated and its frictional engagement therewith is increased.

It also consists in details of construction whereby one member of the gasket is mounted slidably and perhaps loosely on the other, and prevented from disconnection therewith.

The following specification describes the simplest embodiment of these ideas and explains the use of the gasket to sufficient extent to enable those skilled in the art to understand.

In the accompanying drawings forming a part of this specification—Figure 1 is a side elevation of the parts of a pipe coupling about to be connected, showing this improved gasket as held frictionally in place in the end of one of the pipe sections. Fig. 2 is a sectional view through the coupling showing the joint ring as compressed. Fig. 3 is a similar view showing what takes place if the bore of one pipe section is smaller than that of the sustaining ring. Fig. 4 is a side elevation of this gasket before its insertion in the coupling. Fig. 5 is a side elevation of the sustaining ring before its tongues are spread. Fig. 6 is a sectional view of a pipe coupling where the bore of each pipe section is larger, showing this gasket as used in connection therewith. Fig. 7 is a similar view showing the pipe sections slightly out of alinement.

This improved gasket comprises two members of which the outer numbered 8 is the joint ring made preferably of lead or other soft metal, and by preference tapered on its exterior toward one or both ends, although I have shown it in the drawings as conical with its larger end rounded as at $8^b$. The other member 7 is the sustaining ring or tube made preferably of thin brass or other material sufficiently stiff to prevent the joint ring from collapse. This member 7 extends from a point about flush with one end (here shown as the smaller end) of the member 8, throughout its length, and projects beyond its other end as at $7^a$; and the joint ring is fitted closely and yet slidably around the sustaining ring so that it will be held normally in position thereon. It is quite within the scope of the present invention that the sustaining ring should project slightly beyond the smaller end of the joint ring, and that means or devices might be employed to hold these two members so that they cannot become disconnected although still permitting the outer to slide slightly upon the inner if necessary. For instance, the end of the sustaining ring could be flared or expanded slightly as shown at 9 in Fig. 5 and in Fig. 1 where it projects beyond the joint ring, and the latter would be held from dislocation by such flare. The projecting end $7^a$ of the sustaining ring is intended to be inserted in one of the pipe sections when a coupling is to be made, and the gist of the present invention lies in the provision of details rendering such insertion more easy and its frictional retention in said section more secure, as will now be described.

The outer extremity of the projecting end $7^a$ is preferably split as at 10 at a number of points, and the tongues 11 formed between said splits are bent outward slightly whereby the circle within which their tips lie will be slightly larger than the circumference of the member 7 but yet the resilience of the material will permit them to be sprung inward. Before splitting the tubular member 7, the outer corner of its extremity is preferably beveled off as shown at 12, and hence the outer corners of the tips of the tongues will present a slightly conical appearance as best seen in Figs. 2 and 5.

3 and 1 are the conjoined ends of two meeting pipe sections which it is desired to connect, the section 3 having a shoulder 4 and the section 1 having exterior threads, and 5 is a coupling nut for connecting these members. Figs. 1, 2, and 3 illustrate such a coupling as a matter of convenience only, for it is obvious that the shoulder and threads could be reversed, the coupling might be of almost any other form, and the sizes and shapes of the exterior and interior of the two sections might be varied to a considerable degree without departing from the spirit of my invention. When a gasket of the shape shown is to be used in a pipe coupling, the meeting ends of the pipe sections are preferably shaped about as illustrated— that is to say, the end of the section 3 is flat or nearly so, and the end of the section 1 has a flaring mouth 2. By preference the bores of the two sections are alike.

In making a coupling between pipe sections of this character, the use of my improved gasket is as follows: The sections are brought close together as shown in Fig. 1, the projecting end of the sustaining ring is manually inserted into the extremity of one section as 3 (its bevel 12 assisting the entrance of the tongues 11, which latter by their spring action hold it frictionally in place), and both hands of the operator are then free. With one hand he grasps the section 1 and brings it into position with its flaring mouth 2 over the conical exterior of the joint ring 8, and with the other hand he moves up the coupling nut 5 behind the shoulder 4 of the section 3 and engages its threads with those on the section 1 until the parts are connected and a wrench can be brought into play. The use of the latter and the final tightening up of the coupling causes the flaring mouth of the section 1 to move straight toward the square end or shoulder of the section 3 and compress the soft joint ring around the stiff sustaining ring so that the material of the former is projected outward between the extremities of the two pipe sections and within the coupling as shown in Fig. 2. Thus it will be seen that the simple expedient of splitting the projecting end of the sustaining ring and flaring its tongues outward affords a frictional engagement between it and the interior of the pipe section into which it is placed by hand, and the bevel of their outer corners if employed assists their entry into the section.

In Figs. 6 and 7 I have shown how the projecting end of the sustaining ring may fit frictionally within a pipe section whose bore is considerably larger than the outer diameter of said ring, especially if its tongues are long and flared outward considerably, and in these views the bevel 12 is omitted. Fig. 6 shows how the gasket may sag somewhat when in place, and Fig. 7 shows how the pipe section 1 when brought into position may not at first be in axial alinement with the section 3; but in either case the coupling will aline the sections and its final tightening up will compress the joint ring as above described. If the bevel 12 is omitted as shown in these views it is quite probable that the sharp outer corners of the tongues would embed the section 3 so that the final tightening up of parts would cause the flaring mouth of the section 1 to slide the joint ring along upon the sustaining ring with the result described below. Fig. 6 shows the expanded or flaring end 9 as omitted, in which case the joint ring would have to be formed initially upon the sustaining ring with sufficient tightness to hold it from accidental loss; but Fig. 7 shows the flare 9 as employed, in which case the joint ring might be somewhat loose upon the sustaining ring as it cannot slip off either end thereof.

It will be obvious without further illustration, that the sustaining ring might be reversed so that its end 7ª would project beyond the smaller end of the joint ring instead of the larger, in which case it would of course be inserted manually into the end of the other pipe section 1 where it would be retained by the spring of the tongues, and then the coupling could be made as above described. In Fig. 3 the bore 1ª of the pipe section into which the projecting end of the sustaining ring is not placed is shown as smaller than said ring, and the end of the latter is flared at 9 although it need not be. In the final tightening up, with this construction of parts, the end 9 is struck by the flaring wall 2, the entire sustaining ring is pushed into and a little farther through the joint ring, and perhaps some of the material of the latter may be crowded out beyond the end 9 as indicated at 8ª. It will be obvious without further illustration that the bore may be even larger than as shown in Fig. 2, and yet whether it is larger or smaller than the diameter of the sustaining ring a tight joint will be made. I have spoken of the extremities of the tongues as being preferably beveled off on their outer corners. I prefer this to bending them again inward, because the latter would give them a compound bend in their length and require the length to be greater and hence their strength to be less, but it is obvious that said bevel is not absolutely necessary.

What is claimed as new is:

1. As an article of manufacture, a gasket for pipe connections comprising a stiff sustaining ring flared at both ends, and a yielding joint ring surrounding the sustaining ring between its flared portions and held thereon by friction.

2. As an article of manufacture, a gasket for pipe connections comprising a yielding joint ring, and a stiff sustaining ring extending frictionally through and longer than the joint ring and flared at both ends beyond the ends of the joint ring, for the purpose set forth.

3. As an article of manufacture, a gasket for pipe connections comprising a yielding joint ring, and a stiff sustaining ring extending frictionally through and longer than the joint ring, the sustaining ring being flared beyond both ends of the joint ring, for the purpose set forth.

4. As an article of manufacture, a gasket for pipe connections comprising a yielding joint ring, and a stiff sustaining ring extending through and longer than the joint ring, the sustaining ring being flared at one end beyond the joint ring to retain the latter thereon and having at its other end outwardly bent spring fingers, for the purpose set forth.

5. As an article of manufacture, a gasket for pipe connections comprising a stiff sustaining ring split at one end to produce fingers which are bent outward and are resilient, and flared at the other end, and a yielding joint ring mounted slidably upon and around the solid portion of said sustaining ring adjacent said flared end.

In testimony whereof, I have hereunto subscribed my signature this 24th day of December A. D. 1907.

ANTON C. SCHUERMANN.

Witnesses:
LULU TOWNE,
VIRGINIA HAMILTON.